United States Patent
Kimura et al.

(10) Patent No.: US 10,017,668 B2
(45) Date of Patent: Jul. 10, 2018

(54) SURFACE-TREATING AGENT FOR VULCANIZED RUBBER

(71) Applicant: NOK CORPORATION, Tokyo (JP)

(72) Inventors: Natsumi Kimura, Kanagawa (JP); Katsumi Abe, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 15/512,022

(22) PCT Filed: Sep. 18, 2015

(86) PCT No.: PCT/JP2015/076799
§ 371 (c)(1),
(2) Date: Mar. 16, 2017

(87) PCT Pub. No.: WO2016/047640
PCT Pub. Date: Mar. 31, 2016

(65) Prior Publication Data
US 2017/0292037 A1    Oct. 12, 2017

(30) Foreign Application Priority Data
Sep. 22, 2014 (JP) .................................. 2014-192211

(51) Int. Cl.
| | | |
|---|---|---|
| *C08L 9/00* | (2006.01) | |
| *C09D 191/06* | (2006.01) | |
| *C09D 109/00* | (2006.01) | |
| *C09D 127/12* | (2006.01) | |
| *C09D 133/10* | (2006.01) | |
| *C09D 7/12* | (2006.01) | |
| *C08G 18/02* | (2006.01) | |
| *C09D 7/63* | (2018.01) | |

(52) U.S. Cl.
CPC ........... *C09D 191/06* (2013.01); *C08G 18/02* (2013.01); *C09D 7/1233* (2013.01); *C09D 7/63* (2018.01); *C09D 109/00* (2013.01); *C09D 127/12* (2013.01); *C09D 133/10* (2013.01)

(58) Field of Classification Search
CPC ..... C09D 191/05; C09D 7/1233; C08G 18/02
See application file for complete search history.

(56) References Cited

U.S. PATENT DOCUMENTS

| 9,156,998 B2 * | 10/2015 | Higashira ............... B32B 15/06 |
| 9,228,153 B2 * | 1/2016 | Kunieda ............ C08G 18/3206 |
| 2017/0283642 A1 * | 10/2017 | Kimura ................ C09D 127/12 |

FOREIGN PATENT DOCUMENTS

| JP | 03-252442 | 11/1991 |
| JP | 07-165953 | 6/1995 |
| JP | 2003-213122 | 7/2003 |
| JP | 3449014 | 7/2003 |
| JP | 2007-332269 A | 12/2007 |
| JP | 2008-189892 A | 8/2008 |

OTHER PUBLICATIONS

International Search Report from corresponding PCT application No. PCT/JP2015/076799 dated Dec. 28, 2015 (3 pgs).
International Preliminary Report on Patentability and Written Opinion from corresponding PCT application No. PCT/JP2015/076799 dated Apr. 6, 2017 (7 pgs).

* cited by examiner

*Primary Examiner* — Hannah J Pak
(74) *Attorney, Agent, or Firm* — Brinks Gilson & Lione

(57) ABSTRACT

A surface-treating agent for vulcanized rubber, comprising 10 to 160 parts by weight of a wax having a softening point of 40 to 160° C. and 10 to 160 parts by weight of fluororesin particles based on 100 parts by weight of the total amount of isocyanate group-containing 1,2-polybutadiene and an OH group-containing fluororesin composition that has the following formulation:
  a copolymer [I] of
    (A) a perfluoroalkylalkyl (meth)acrylate and
    (B) a hydroxyl group-containing (meth)acrylate,
  a polymer [II] of an acrylic acid alkyl ester,
  a polymer [III] of a fluorinated olefin, and
  a curing agent [IV];
wherein the weight ratio of the isocyanate group-containing 1,2-polybutadiene and the OH group-containing fluororesin composition is 50:50 to 95:5.

3 Claims, No Drawings

SURFACE-TREATING AGENT FOR VULCANIZED RUBBER

RELATED APPLICATION

This application is a 35 U.S.C. § 371 national phase filing of International Patent Application No. PCT/JP2015/076799, filed Sep. 18, 2015, which claims priority under 35 U.S.C. § 119 to Japanese Patent Application No. 2014-192211, filed Sep. 22, 2014, the entire disclosure of which is hereby expressly incorporated by reference.

TECHNICAL FIELD

The present invention relates to a surface-treating agent for vulcanized rubber. More particularly, the present invention relates to a surface-treating agent for vulcanized rubber that further reduces the friction and improves abrasion resistance of the entire coating film.

BACKGROUND ART

Graphite coating films, coating films of metal salts or amides of fatty acids, waxes such as paraffin, silicone oil, and the like, or coating films containing ethyl cellulose, phenolic resin, or the like as a binder are conventionally formed on the surface of rubber layers of rubber-coated metal gaskets, or on the surface of rubber elastic sliding parts, such as bearing seals and oil seals, for the purpose of preventing fixing, inhibiting blocking, and improving abrasion resistance. Engine gaskets, and the like are used under the conditions of a high surface pressure and high temperature. When the vibration of an engine is further added to these conditions, the rubber coating layer on the surface of the gasket is abraded, and gas leakage may occur. Moreover, the rubber coating layer of rubber elastic sliding parts, such as bearing seals and oil seals, is abraded due to repeated sliding, and oil leakage may occur.

Accordingly, as a surface-treating agent for vulcanized rubber that hardly results in a phenomenon in which the rubber coating layer on the gasket surface is abraded or damaged even under severe service conditions, including high surface pressure and high temperature, as well as vibration, i.e., the use environment of engine head gaskets, and that can form a rubber layer of a gasket effective for gas sealing, the present applicant previously proposed a surface-treating agent for vulcanized rubber in which an aqueous dispersion of polyolefin resin is added to liquid hydroxyl group-containing 1,2-polybutadiene and isocyanate group-containing 1,2-polybutadiene as a curing agent thereof (Patent Document 1).

The surface-treating agent for vulcanized rubber proposed in Patent Document 1 achieved the intended purpose of improving the abrasion resistance of the rubber coating layer. However, due to the use of an aqueous dispersion, water promoted the reaction between the hydroxyl group and the isocyanate group in the 1,2-polybutadiene, and water also reacted with the isocyanate group itself; thus the viscosity of the surface-treating dispersion was increased, and gelation occurred. This caused the problem of poor workability during the coating process. Furthermore, as a result of the reaction between water and the isocyanate group, importing high molecular weight to 1,2-polybutadiene was prevented, and there were drawbacks that the abrasion resistance, peeling resistance, and sliding properties of the surface treatment layer were inferior.

In order to solve the above problems, the present applicant further proposed a surface-treating agent for vulcanized rubber that uses an organic solvent dispersion of polyolefin resin in place of an aqueous dispersion of polyolefin resin (Patent Document 2). However, this method did not use a fluororesin, such as polytetrafluoroethylene, and there was thus a problem that the coating film was peeled due to adhesion during high temperature compression, and friction and abrasion at high surface pressure.

As a surface-treating agent for vulcanized rubber that does not lead to the peeling of a coating film due to adhesion during high temperature compression, and friction and abrasion at high surface pressure, without impairing the performance conventionally required for surface-treating agents for vulcanized rubber, such as prevention of fixing, inhibition of blocking, and improvement of abrasion resistance, the present applicant further proposed a surface-treating agent for vulcanized rubber comprising an organic solvent solution comprising 10 to 160 parts by weight of wax having a softening point of 40 to 160° C. and 10 to 160 parts by weight of fluororesin, based on 100 parts by weight of isocyanate group-containing 1,2-polybutadiene or a 1,2-polybutadiene mixture of isocyanate group-containing 1,2-polybutadiene and hydroxyl group-containing 1,2-polybutadiene (Patent Document 3).

PRIOR ART DOCUMENTS

Patent Documents

Patent Document 1: JP-A-3-252442
Patent Document 2: JP-A-7-165953
Patent Document 3: JP-A-2003-213122
Patent Document 4: JP-B-3449014

OUTLINE OF THE INVENTION

Problem to be Solved by the Invention

An object of the present invention is to provide a surface-treating agent for vulcanized rubber comprising isocyanate group-containing 1,2-polybutadiene, a wax having a softening point of 40 to 160° C., and fluororesin particles as essential components, wherein the friction of the entire coating film formed from the surface-treating agent is further reduced, and the abrasion resistance of the sliding surface associated therewith is improved.

Means for Solving the Problem

The above object of the present invention can be achieved by a surface-treating agent for vulcanized rubber, comprising 10 to 160 parts by weight of a wax having a softening point of 40 to 160° C. and 10 to 160 parts by weight of fluororesin particles based on 100 parts by weight of the total amount of isocyanate group-containing 1,2-polybutadiene and an OH group-containing fluororesin composition that has the following formulation:
  a copolymer [I] of
  (A) a perfluoroalkylalkyl (meth)acrylate and
  (B) a hydroxyl group-containing (meth)acrylate,
  a polymer [II] of an acrylic acid alkyl ester,
  a polymer [III] of a fluorinated olefin, and
  a curing agent [IV];
wherein the weight ratio of the isocyanate group-containing 1,2-polybutadiene and the OH group-containing fluororesin composition is 50:50 to 95:5.

Effect of the Invention

In the prior art, fluororesin particles were compounded as a filler component of a coating agent to thereby reduce friction and improve abrasion resistance. However, the isocyanate group-containing 1,2-polybutadiene resin, which is a binder component, does not contain a friction reducing component, and it is thus difficult to further reduce friction.

In the present invention, an OH group-containing fluororesin composition, which has a friction reducing effect, is added as an organic solvent solution to the binder component of the above prior art embodiment, thereby reducing not only the friction of the filler component, but also the friction of the binder component. Thus, the friction of the entire coating film can be further reduced, and the abrasion resistance of the sliding surface associated therewith can be improved.

The surface-treating agent for vulcanized rubber according to the present invention is not only effectively applied to seal parts, such as seal lip parts of oil seals, but also effective to prevent the adhesion, reduce the friction, and improve the abrasion resistance of rubber parts, such as rubber rolls and rubber belts for copying machines, rubber hoses and rubber belts for industrial use, and wipers, weather strips, and glass runs for automobiles.

EMBODIMENTS FOR CARRYING OUT THE INVENTION

As the isocyanate group-containing 1,2-polybutadiene, one having a molecular weight of about 1,000 to 3,000 in which an isocyanate group is added as a terminal group is used. This can be a commercial product having a solid matters content of about 3 to 70 wt. %, for example, Nisso TP-1001 (produced by Nippon Soda Co., Ltd.; a butyl acetate solution having a solid matters content of 50 wt. %) can be used as it is. The polybutadiene resin can react with the functional groups on the surface of the vulcanized rubber and with the hydroxyl group-containing component for bonding and curing. The affinity and compatibility of the polybutadiene resin with rubber are superior to those of polyurethane resins that similarly react with an isocyanate group to achieve a higher molecular weight. Thus, the polybutadiene resin is characterized by excellent adhesion with rubber, particularly excellent friction and abrasion resistance characteristics.

Moreover, the isocyanate group-containing 1,2-polybutadiene, in which an isocyanate group is added as a terminal group, reacts with the functional groups on the surface of the vulcanized rubber to achieve a high molecular weight.

The OH group-containing fluororesin composition used as an organic solvent solution comprises about 10 to 50 wt. %, as solid matters content, of a composition comprising:
  [I] a copolymer of
    (A) a perfluoroalkylalkyl (meth)acrylate and
    (B) a hydroxyl group-containing (meth)acrylate,
  [II] a polymer of an acrylic acid alkyl ester,
  [III] a polymer of a fluorinated olefin, and
  [IV] a curing agent;
wherein the weight ratio of the copolymer [I], the polymer [II], and the polymer [III] is 2 to 15:35 to 70:20 to 50 (total: 100): etc.

Since the OH group-containing fluororesin composition solution has an OH-modified group, it can effectively react with the isocyanate group-containing 1,2-polybutadiene, which is a binder component, to form a stable and highly durable film. The details of the OH group-containing fluororesin composition are described, for example, in Patent Document 4. Moreover, as the organic solvent, for example, a methyl isobutyl ketone-ethyl acetate-methyl ethyl ketone mixed solvent or the like is used.

As the hydroxyl group-containing (meth)acrylate, which is the component (B) of the copolymer [I], for example, 2-hydroxyethyl (meth)acrylate or the like is used. The polymer [II] is an important component in terms of adhesion with a substrate, compatibility with other components, and formation of a film that satisfies the need. As the polymer [III], for example, a vinylidene fluoride-based polymer or the like is used. The polymer [III] is located in an intermediate position between the copolymer [I], which is a surface component, and the polymer [II], which is an adhesion component, in the cross-sectional direction of the film, and serves as a barrier layer for preventing the transfer of additives, such as a pigment, a dye, and a plasticizer, contained in the substrate resin to the coating layer. As the curing agent [IV], an organic compound having a reactive functional group reactive with OH groups, such as an isocyanate group or an epoxy group, is used at a ratio of about 0.001 to 100 wt. % based on the total amount of the polymers [I], [II], and [III].

As the OH-containing fluororesin composition solution, commercial products, such as Defensa TR-101 (OH value: 6.0 mgKOH/g solution), 102 (OH value: 2.7 mgKOH/g solution), and 103 (OH value: 4.1 mgKOH/g solution) (all of which are produced by DIC Corporation), are practically used.

The isocyanate group-containing 1,2-polybutadiene and the OH group-containing fluororesin composition are used at a weight ratio of 50:50 to 95:5, preferably 60:40 to 90:10. If the amount of the OH group-containing fluororesin composition used is less than this range, friction is not reduced, and abrasion resistance is not improved. In contrast, even if the amount of the OH group-containing fluororesin composition used is greater than this range, abrasion resistance characteristics is not improved.

Examples of usable waxes include plant-based waxes, petroleum-based waxes, synthetic waxes, and the like waxes having a softening point of 40 to 160° C., preferably 60 to 120° C. Examples of plant-based waxes include carnauba wax, candelilla wax, rice wax, and the like. Examples of petroleum-based waxes include paraffin wax, microcrystalline wax, and the like. Examples of synthetic waxes include polyethylene wax, Fischer-Tropsch wax, fatty acid amide, various modified waxes, and the like. In general, commercially available waxes can be used as they are. If a wax having a softening point higher than this range is used, sliding properties and non-adhesiveness tend to be reduced. In contrast, if a wax having a softening point lower than this range is used, the adhesion between the rubber and the surface-treating agent, and friction and abrasion resistance tend to be reduced.

Examples of fluororesin particles include particulate polytetrafluoroethylene [PTFE], tetrafluoroethylene/hexafluoropropylene copolymers, tetrafluoroethylene/perfluoro(alkyl vinyl ether) copolymers, polyvinylidene fluoride, polyvinyl fluoride, ethylene/tetrafluoroethylene copolymers, and the like.

Usable examples of such fluororesin particles include particles prepared by classifying a fluororesin obtained by block polymerization, suspension polymerization, solution polymerization, emulsion polymerization, or the like to a particle size of about 0.1 to 5 μm; particles prepared by finely dispersing a dispersion obtained by suspension polymerization, solution polymerization, emulsion polymerization, or the like, by shear stirring, etc., to a particle size of about 0.1 to 5 μm; or particles prepared by coagulating and drying a product obtained by polymerization mentioned above, followed by atomization to a particle size of about 10 μm or less by dry grinding or cooling grinding. In the particle size set to be about 0.1 to 10 μm, a smaller particle size brings an advantage that the coating thickness can be reduced; however, the unevenness of the coating surface becomes small, thereby reducing the contact area. Accordingly, the friction coefficient tends to increase at a low surface pressure. In contrast, a larger particle size increases the coating thickness, and causes a higher coating cost; however, the unevenness becomes large, and the contact area with a mating material becomes small at a low surface pressure. Accordingly, the friction coefficient tends to decrease. Therefore, the particle size is suitably adjusted depending on use demand. For example, for use in seal parts, the particle size is determined in consideration of these advantages and disadvantages, and particles having a particle size of about 0.5 to 2 μm are preferably used.

As for the amounts of the wax and fluororesin particles, at least one of plant-based waxes, petroleum-based waxes, and synthetic waxes is used at a ratio of 10 to 160 parts by weight, and the fluororesin particles are used at a ratio of 10 to 160 parts by weight, based on 100 parts by weight of the total amount of the isocyanate group-containing 1,2-polybutadiene and the OH group-containing fluororesin composition. If the ratio of the wax is greater than this range, the adhesion with rubber and the friction and abrasion resistance tend to be reduced. In contrast, if the ratio of the wax is less than this range, the flexibility, sliding properties, and non-adhesiveness of the film are deteriorated. Moreover, if the ratio of the fluororesin particles is greater than this range, the adhesion with rubber and the friction and abrasion resistance are reduced, and the flexibility of the film is impaired. Consequently, cracks are formed on the cured coating film. In contrast, if the ratio of the fluororesin particles is less than this range, sliding properties and non-adhesiveness tend to be reduced. Each of these components is used as an organic solvent solution or dispersion having a solid matters content of about 1 to 40 wt. %. When the vulcanized rubber surface-treating agent of the present invention is used for seal parts, etc., the amount of each of the wax and the fluororesin particles is preferably 25 to 120 parts by weight.

As the organic solvent, toluene, xylene, ethyl acetate, butyl acetate, methyl ethyl ketone, methyl isobutyl ketone, and the like are used singly or as a mixed solvent. The dilution amount with the organic solvent is suitably selected depending on the coating thickness (film thickness) and the coating method. In general, it is set so that the total solid matters content is about 5 to 20 wt. %. The film thickness is generally 1 to 10 μm, preferably 2 to 5 μm. If the film thickness is less than this range, the entire rubber surface cannot be coated, and sliding properties and non-adhesiveness may be impaired. In contrast, if the film thickness is greater than this range, the stiffness of the coating surface is higher, and sealing properties and flexibility may be impaired. The film thickness is preferably about 1 to 5 μm for use in seal parts and the like.

Examples of the rubber that can be treated with such a surface-treating agent include fluororubber, nitrile rubber, hydrogenated nitrile rubber, ethylene-propylene rubber, styrene-butadiene rubber, acrylic rubber, chloroprene rubber, butyl rubber, natural rubber, and other general rubber materials. Among these, rubber materials having little blooming of an antioxidant, oil, and the like, which are compounded in the rubber, to the rubber surface layer, are preferably used.

The compounding proportion of each component, the type of organic solvent, the amount of organic solvent, and the organic solvent mixing ratio are suitably selected depending on the rubber material and the purpose.

Examples of the coating method of the vulcanized rubber surface-treating agent to a rubber surface include, but are not limited thereto, dipping, spraying, roll coater, flow coater, and the like. In this case, it is preferable that dirt, and the like, on the rubber surface are previously removed by washing or the like before the surface-treating agent is applied. In particular, washing with water, a detergent, a solvent, etc., and drying are performed when blooming and bleeding from the vulcanized rubber are deposited on the surface.

After the vulcanized rubber surface-treating agent is applied to the rubber surface, heat treatment is performed at about 150 to 250° C. for about 10 minutes to 24 hours for calcining. If the heating temperature is lower than this range or the heating time is shorter than this range, the curing of the film and the adhesion with the rubber are insufficient, and non-adhesiveness and sliding properties are deteriorated. In contrast, if the heating temperature is higher than this range or the heating time is longer than this range, heat aging of the rubber occurs. Therefore, it is necessary to suitably set the heating temperature and heating time depending on the heat resistance of various rubbers.

Moreover, for vulcanized rubber for which a reduction in the amount of outgassing is required, heat treatment, reduced pressure treatment, extraction treatment, etc., can be performed singly or in combination; however, heat treatment is economically the best. In order to reduce the amount of outgassing, heat treatment at about 150 to 250° C. for about 1 to 24 hours for calcining is preferable. A higher temperature and a longer time are more effective to gasify low-molecular components in the rubber, and low-molecular components contained in the wax and polybutadiene in the film.

EXAMPLES

The following describes the present invention with reference to Examples.

Example 1

| | |
|---|---|
| Fluororesin particle solution (particle size: 0.2 μm; a butyl acetate solution having a solid matters content of 5 wt. %) | 467 parts by weight |
| PE wax solution (a butyl acetate solution having a solid matters content of 5 wt. %) | 467 parts by weight |
| NCO-containing 1,2-polybutadiene solution (Nisso TP-1001, produced by Nippon Soda Co., Ltd.; a butyl acetate solution having a solid matters content of 50 wt. %) | 55 parts by weight |
| OH group-containing fluororesin composition solution (Defensa TR-103, produced by DIC Corporation; OH value: 4.1 mgKOH/g solution, a MIBK-butyl acetate-MEK solution having a solid matters content of 30 wt. %) | 11 parts by weight |

A surface-treating agent comprising the above components (NCO-containing polybutadiene/OH group-containing fluororesin composition=90/10) was prepared, and the following items were measured and evaluated.

Binder hardness: Only the binder component of the coating agent (except for the fluororesin particle component) was applied to a metal plate so that the film thickness was 50 µm, and calcined at 200° C. for 10 hours to prepare a sample. Using a dynamics ultra-micro hardness tester (produced by Shimadzu Corporation), a triangular pyramid indenter (tip angle: 115°) was pressed into the sample at a load speed of 14.1 mN/sec, and the dynamics hardness when the pressing depth was 10 µm was measured.

Friction coefficient: The coating agent was applied to the surface of fluororubber (thickness: 2 mm) molded by vulcanization compression to a film thickness of 10 µm, and calcined at 200° C. for 10 hours to prepare a sample. Using HEIDON TYPE 14DR (produced by Shinto Scientific Co., Ltd.), a steel ball (diameter: 10 mm) with a load of 50 g was pressed to the surface of the coating film, and moved for a reciprocating distance of 50 mm at a speed of 50 mm/min. Then, the dynamic friction coefficient was measured.

(Evaluation)
◎: less than 0.13
Δ: 0.13 or more and less than 0.17
x: 0.17 or more Abrasion resistance test: The coating agent was applied to the surface of fluororubber (thickness: 2 mm) molded by vulcanization compression to a film thickness of 10 µm, and calcined at 200° C. for 10 hours to prepare a sample. Using a Friction Player FPR-2000 (produced by Rhesca Co., Ltd.), an indenter ball (diameter: 3 mm) with a load of 2 kg was pressed to the surface of the coating film, and rotated with an average surface pressure of 3.9 MPa at a linear speed of 20.9 cm/sec. Then, the number of rotations until the coating film was peeled so that the rubber was exposed was measured.

(Evaluation)
⊚: 150,000 rotations or more
◯: 50,000 rotations or more and less than 150,000 rotations
Δ: 10,000 rotations or more and less than 50,000 rotations
x: less than 10,000 rotations

Example 2

| | |
|---|---|
| Fluororesin particle solution (same as Example 1) | 460 parts by weight |
| PE wax solution (same as Example 1) | 460 parts by weight |
| NCO-containing polybutadiene solution (Nisso TP-1001) | 30 parts by weight |
| OH group-containing fluororesin composition solution (Defensa TR-103) | 50 parts by weight |

A surface-treating agent comprising the above components (NCO-containing polybutadiene/OH group-containing fluororesin composition=50/50) was prepared, and the same measurement and evaluation as in Example 1 were performed.

Comparative Example 1

| | |
|---|---|
| Fluororesin particle solution (same as Example 1) | 458 parts by weight |
| PE wax solution (same as Example 1) | 458 parts by weight |
| NCO-containing polybutadiene solution (Nisso TP-1001) | 24 parts by weight |
| OH group-containing fluororesin composition solution (Defensa TR-103) | 60 parts by weight |

A surface-treating agent comprising the above components (NCO-containing polybutadiene/OH group-containing fluororesin composition=40/60) was prepared, and the same measurement and evaluation as in Example 1 were performed.

Comparative Example 2

In Example 1, the amount of the fluororesin particle solution was changed to 469 parts by weight, the amount of the PE wax solution was changed to 469 parts by weight, and the amount of the NCO-containing polybutadiene solution was changed to 62 parts by weight. Then, a surface-treating agent that did not use an OH group-containing fluororesin composition solution (NCO-containing polybutadiene/OH group-containing fluororesin composition=100/0) was prepared, and the same measurement and evaluation as in Example 1 were performed.

Comparative Example 3

| | |
|---|---|
| Fluororesin particle solution (same as Example 1) | 365 parts by weight |
| PE wax solution (same as Example 1) | 365 parts by weight |
| OH group-containing fluororesin composition solution (Defensa TR-103) | 40 parts by weight |
| Urethane resin solution (16-416, produced by DIC Corporation; a MEK-IPA mixed solvent solution having a solid matters content of 30 wt. %) | 40 parts by weight |
| Methyl ethyl ketone [MEK] | 95 parts by weight |
| Isopropanol [IPA] | 95 parts by weight |

A surface-treating agent comprising the above components (Urethane resin/OH group-containing fluororesin composition=50/50) was prepared, and the same measurement and evaluation as in Example 1 were performed.

The following table shows the measurement and evaluation results obtained in the above Examples and Comparative Examples.

TABLE

| | | Friction coefficient | | Abrasion resistance | |
|---|---|---|---|---|---|
| Example | Binder hardness | Measurement value | Evaluation | Measurement value (×10⁴ times) | Evaluation |
| Ex. 1 | 6.7 | 0.12 | ◯ | 30 | ⊚ |
| Ex. 2 | 5.2 | 0.10 | ◯ | 5 | ◯ |
| Comp. Ex. 1 | 4.8 | 0.08 | ◯ | 3 | Δ |
| Comp. Ex. 2 | 7.6 | 0.15 | Δ | 3 | Δ |
| Comp. Ex. 3 | 1.1 | 0.10 | ◯ | 0.3 | X |

The invention claimed is:

1. A surface-treating agent for vulcanized rubber, wherein the surface-treating agent comprises 10 to 160 parts by weight of a wax having a softening point of 40 to 160° C. and 10 to 160 parts by weight of fluororesin particles based on 100 parts by weight of the total amount of isocyanate group-containing 1,2-polybutadiene and an OH group-containing fluororesin composition that has the following formulation:

a copolymer [I] of (A) a perfluoroalkylalkyl (meth)acrylate and
(B) a hydroxyl group-containing
(meth)acrylate, a polymer [II] of an acrylic acid alkyl ester,
a polymer [III] of a fluorinated olefin, and a curing agent [IV];
wherein the weight ratio of the isocyanate group-containing 1,2-polybutadiene and the OH group-containing fluororesin is 50:50 to 95:5, and the isocyanate group-containing 1,2-polybutadiene and the OH-group containing fluororesin composition are both used as organic solvent solutions.

2. The surface-treating agent for vulcanized rubber according to claim 1.

3. An oil seal having a seal lip part with a coating film formed form the surface-treating agent for vulcanized rubber according to claim 2.

* * * * *